US010567233B2

United States Patent
Mizuta

(10) Patent No.: US 10,567,233 B2
(45) Date of Patent: *Feb. 18, 2020

(54) SHADOW AGENT PROJECTION IN MULTIPLE PLACES TO REDUCE AGENT MOVEMENT OVER NODES IN DISTRIBUTED AGENT-BASED SIMULATION

(71) Applicant: INTERNATIONAL BUSINESS MACHINES CORPORATION, Armonk, NY (US)

(72) Inventor: Hideyuki Mizuta, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 339 days.

This patent is subject to a terminal disclaimer.

(21) Appl. No.: 15/616,489

(22) Filed: Jun. 7, 2017

(65) Prior Publication Data
US 2018/0359309 A1    Dec. 13, 2018

(51) Int. Cl.
*H04L 12/24*        (2006.01)
(52) U.S. Cl.
CPC .................................. *H04L 41/12* (2013.01)
(58) Field of Classification Search
None
See application file for complete search history.

(56) References Cited

U.S. PATENT DOCUMENTS

| | | | | |
|---|---|---|---|---|
| 5,774,656 A | * | 6/1998 | Hattori | H04L 61/15 709/223 |
| 6,681,010 B1 | * | 1/2004 | Anderson | H04M 3/5191 379/265.02 |
| 6,775,701 B1 | * | 8/2004 | Pan | H04L 41/0896 709/226 |
| 7,320,088 B1 | * | 1/2008 | Gawali | G06F 11/1662 709/219 |
| 7,805,583 B1 | * | 9/2010 | Todd | G06F 3/0617 711/161 |
| 10,313,257 B1 | * | 6/2019 | Hunt | H04L 47/50 |
| 2002/0198984 A1 | * | 12/2002 | Goldstein | G06F 11/323 709/224 |

(Continued)

OTHER PUBLICATIONS

"Large-scale Distributed Agent-based Simulation for Shopping Mall and Performance Improvement with Shadow Agent Projection", Proceedings of the 16th International Conference on Autonomous Agents and Multiagent Systems, May 2017, 17 pages.

(Continued)

*Primary Examiner* — Backhean Tiv
(74) *Attorney, Agent, or Firm* — Tutunjian & Bitetto, P.C.; Vazken Alexanian

(57) ABSTRACT

A computer-implemented method is provided for distributed computing. The method includes forming interaction specific shadow agents by extracting agent interaction data from an original agent at a source node utilizing agent-based simulators. The method further includes broadcasting aggregated agent interaction data collected from the original agent at a source node to other nodes in a distributed area to calculate agent interactions and behaviors therefrom. The agent interaction data extracted from the original agent consists of a constrained subset of data derived from a set of data of the original agent at the source node.

12 Claims, 10 Drawing Sheets

(56) References Cited

U.S. PATENT DOCUMENTS

| | | | |
|---|---|---|---|
| 2005/0066350 A1* | 3/2005 | Meuleman | H04N 7/17318 725/10 |
| 2005/0108453 A1* | 5/2005 | Maturana | G05B 19/0421 710/100 |
| 2006/0095914 A1* | 5/2006 | Mankovski | G06F 9/4843 718/100 |
| 2006/0225075 A1* | 10/2006 | Mankovski | G06F 9/5027 718/102 |
| 2007/0288536 A1* | 12/2007 | Sen | G06F 11/1448 |
| 2010/0218104 A1* | 8/2010 | Lewis | G06Q 10/04 715/736 |
| 2011/0137614 A1* | 6/2011 | Wheeler | H04L 67/12 702/188 |
| 2011/0231383 A1* | 9/2011 | Smyth | G06F 16/3349 707/707 |
| 2013/0036322 A1* | 2/2013 | Bauer | H04L 41/0668 714/4.1 |
| 2013/0246064 A1* | 9/2013 | Wasserblat | G10L 25/78 704/244 |
| 2014/0177821 A1* | 6/2014 | Ristock | G06Q 10/0631 379/266.08 |
| 2014/0280821 A1* | 9/2014 | Maitland | H04L 41/0668 709/223 |
| 2018/0032863 A1* | 2/2018 | Graepel | G06N 3/04 |
| 2018/0181310 A1* | 6/2018 | Feinberg | G06F 3/065 |
| 2018/0359309 A1* | 12/2018 | Mizuta | H04L 41/12 |
| 2018/0359310 A1* | 12/2018 | Mizuta | H04L 41/12 |

OTHER PUBLICATIONS

Biddlestone, "Collaborative Motion for Mobile Platforms", Ohio State University, Feb. 2013, 149 pages.

Bansal, "Incorporating Fault Tolerance in Distributed Agent Based Systems by Simulating Bio-Computing Model of Stress Pathways", Proc. of SPIE, May 2006, 10 pages.

Hüning, et al., "Modeling & Simulation as a Service with the Massive Multi-agent System MARS", ADS '16 Proceedings of the Agent-Directed Simulation Symposium Article No. 1, Apr. 2016, 2 pages.

* cited by examiner

SHADOW AGENT PROJECTION IN MULTIPLE PLACES TO REDUCE AGENT MOVEMENT OVER NODES IN DISTRIBUTED AGENT-BASED SIMULATION

BACKGROUND

Technical Field

The present invention relates generally to information processing and, in particular, to shadow agent projection in multiple places to reduce agent movement over nodes in a distributed agent-based simulation.

Description of the Related Art

Recently, agent-based social simulations have been utilized to support the decision making of city planners for various social issues including evacuation and intelligent.

To evaluate complex behavior with interactions among heterogeneous people in a large city, such a social simulation needs to manage a large number (e.g., millions) of agents with various behavior models and preferences. Moreover, computation speed is also required to repeatedly analyze enormous combinations of possible situations and strategies.

Thus, the distributed parallel execution of large-scale agent-based social simulations is very important for evaluating the complex social interaction of an enormous number of people and situations with acceptable performance.

X10-based Agent Simulation on Distributed Infrastructure (XASDI) developed by IBM® is a platform to realize the distributed parallel execution of large-scale social simulation with X10.

X10 denotes a distributed node as a "Place", and provides functionalities of a global address space, parallel execution, and synchronization among multi-Places. By using X10, XASDI manages distributed agents and realizes the message and agent transfer between Places.

Realistic social agents tend to include a large amount of data that, in turn, includes demographics, preferences, and history. Hence, the transfer of such an agent incurs a heavy communication cost that has an adverse effect on performance.

Accordingly, there is a need for an improved approach to transfer an agent.

SUMMARY

According to an aspect of the present invention, a computer-implemented method is provided for distributed computing. The method includes forming interaction specific shadow agents by extracting agent interaction data from an original agent at a source node utilizing agent-based simulators. The method further includes broadcasting aggregated agent interaction data collected from the original agent at the source node to other nodes in a distributed area to calculate agent interactions and behaviors therefrom. The agent interaction data extracted from the original agent consists of a constrained subset of data derived from a set of data of the original agent at the source node.

According to another aspect of the present invention, a computer program product is provided for distributed computing. The computer program product includes a non-transitory computer readable storage medium having program instructions embodied therewith. The program instructions are executable by a computer to cause the computer to perform a method. The method includes forming interaction specific shadow agents by extracting agent interaction data from an original agent at a source node utilizing agent-based simulators. The method further includes broadcasting aggregated agent interaction data collected from the original agent at the source node to other nodes in a distributed area to calculate agent interactions and behaviors therefrom. The agent interaction data extracted from the original agent consists of a constrained subset of data derived from a set of data of the original agent at the source node.

According to yet another aspect of the present invention, a distributed computing system is provided. The distributed computing system includes a set of interaction specific shadow agents having agent-based simulators for extracting agent interaction data from an original agent as interaction specific shadow agents. The interaction specific shadow agents data in the set are configured to broadcast, from a source node to other nodes in a distributed area, aggregated agent interaction data collected from the original agents at a source node to calculate further agent interaction and behavior therefrom. The agent interaction data extracted from the original agents for the interaction specific shadow agents consists of a constrained subset of data derived from a set of data of an original agent at the source node.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to shadow agent projection in multiple places to reduce agent movement over nodes in a distributed agent-based simulation.

In an embodiment, the agent-based simulator utilizes a shadow agent that has only information required to compute an interaction (for example, position, and speed) at each simulation time step to decrease the size of the data transferred among distributed nodes.

A set of shadow agents corresponding to the original agent at the source node are distributed in all other (related) nodes where the information of the agent is used for calculating the interactions.

There is no transfer of an agent itself but only projection of the shadow agent to other nodes using broadcast messages. The data for interaction in the shadow agent is much less than the total data of the substantial (original) agent including all preferences, demographic, and historical record data.

The interaction of agents are evaluated within a divided area called a zone (e.g., a road or a shop). The required information for the shadow agents are collected in each zone based on agent' behavior models for the simulation. The aggregated data set for shadow agents in each zone is stored in a broadcast message and sent to other nodes. At the destination node, zones can use the shadow information set to calculate the interaction among agents efficiently. The collection and broadcast of shadow information are executed after all agents' actions and updated before the agent behavior phase in the next time step.

Figure 1:
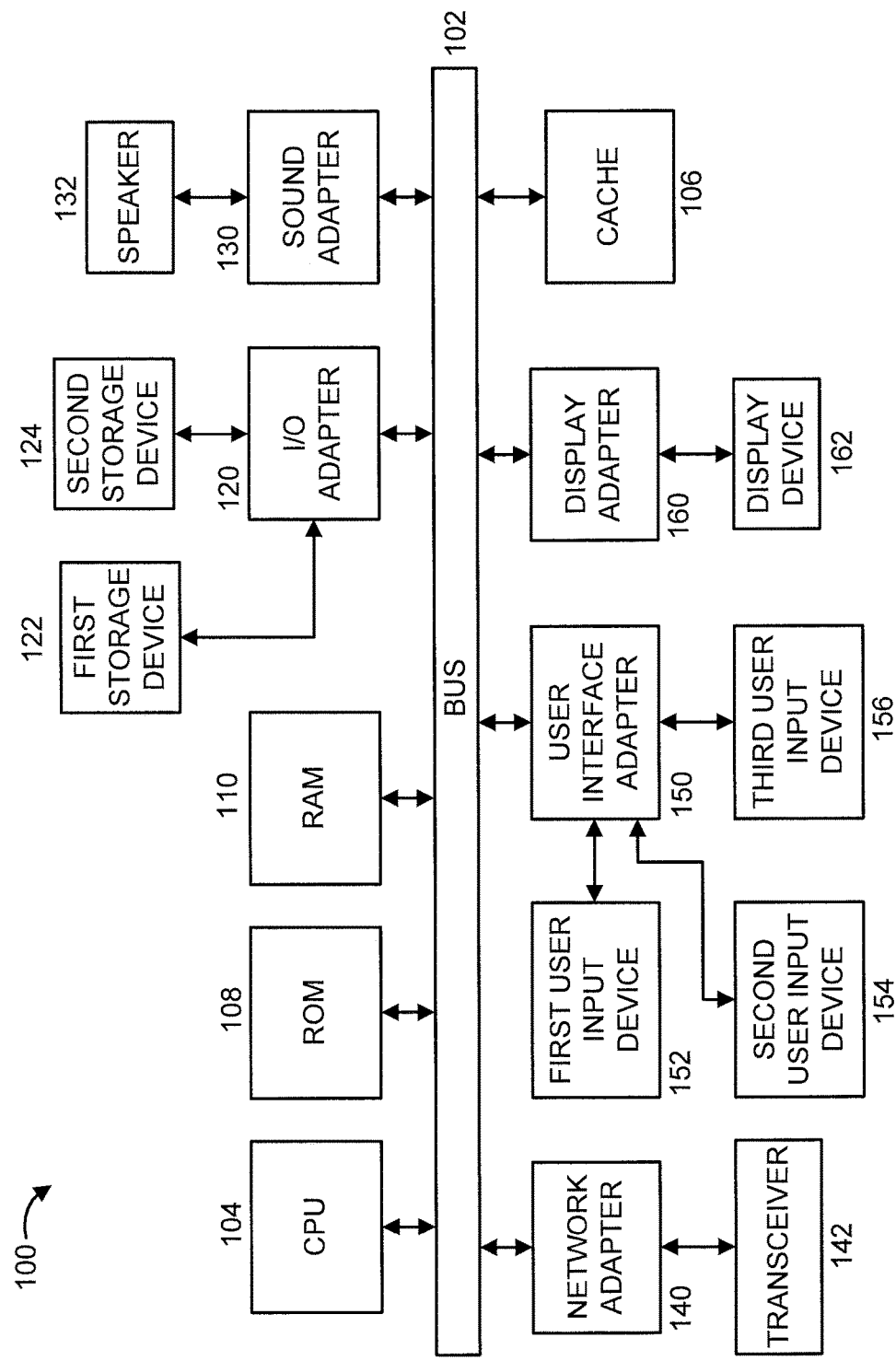
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
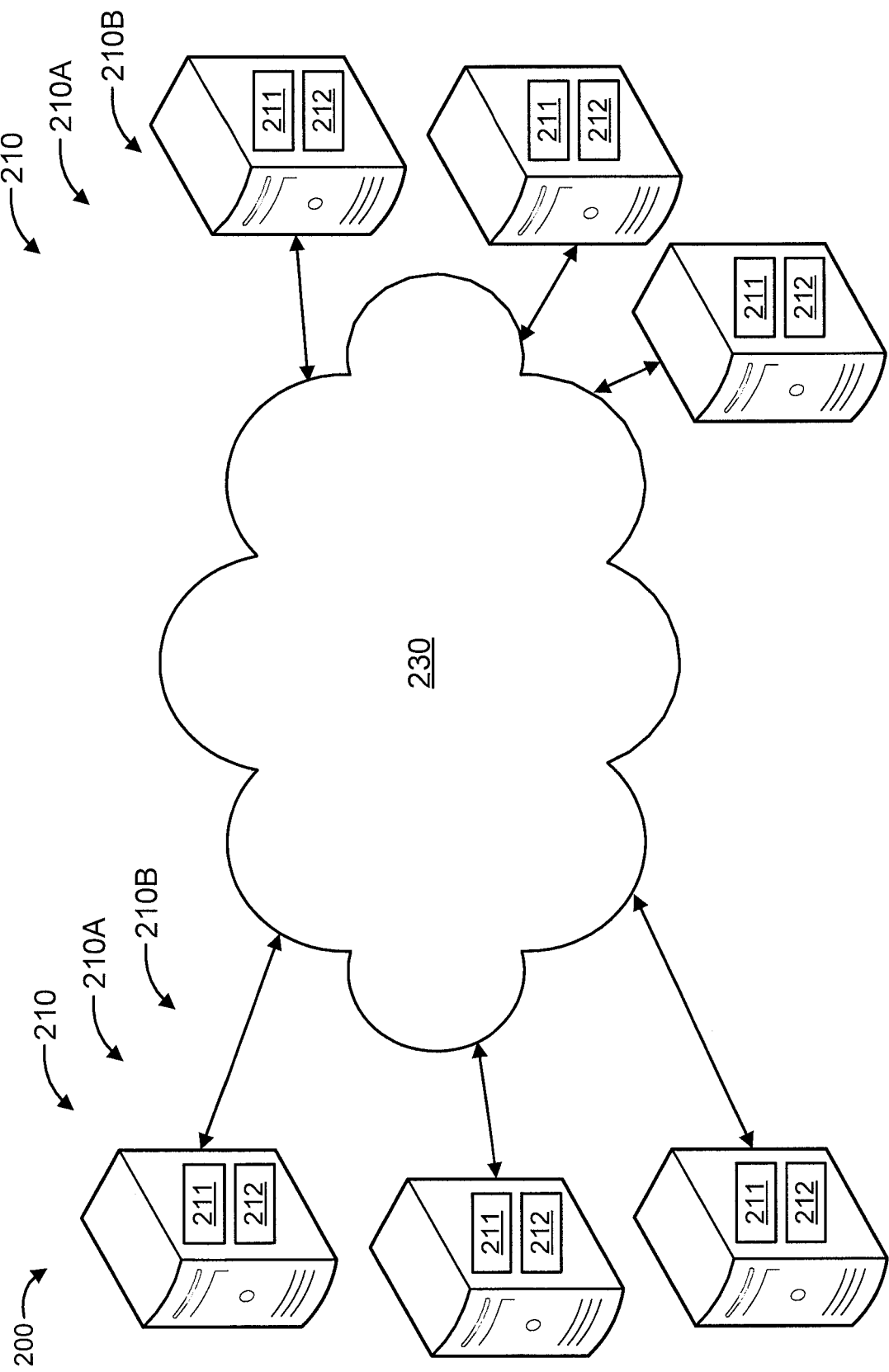
FIG. 2 shows an exemplary environment to which the present invention can be applied, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
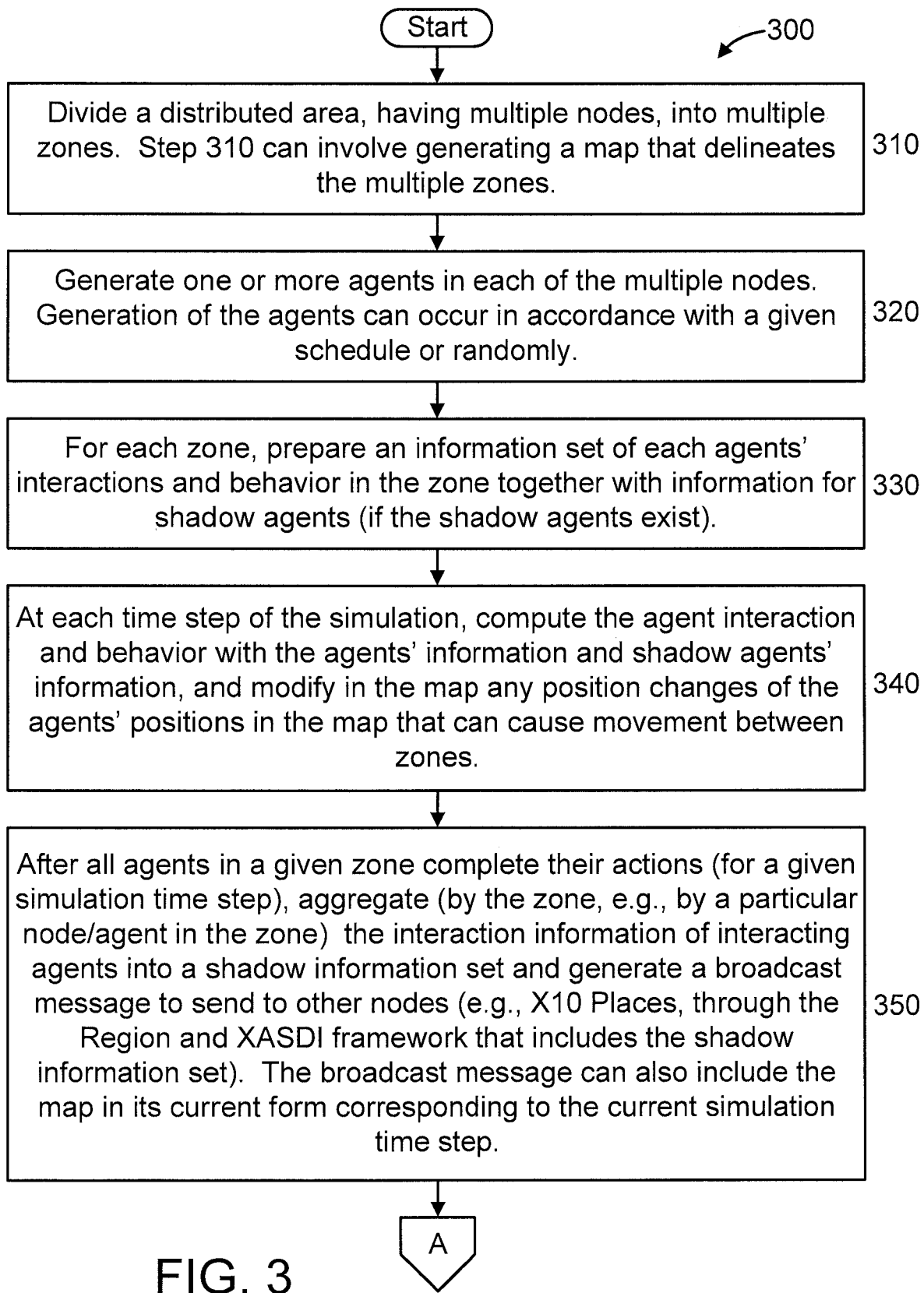
FIGS. 3-4 show an exemplary method for shadow agent projection in multiple places in a distributed environment, in accordance with an embodiment of the present invention.
Figure 4:
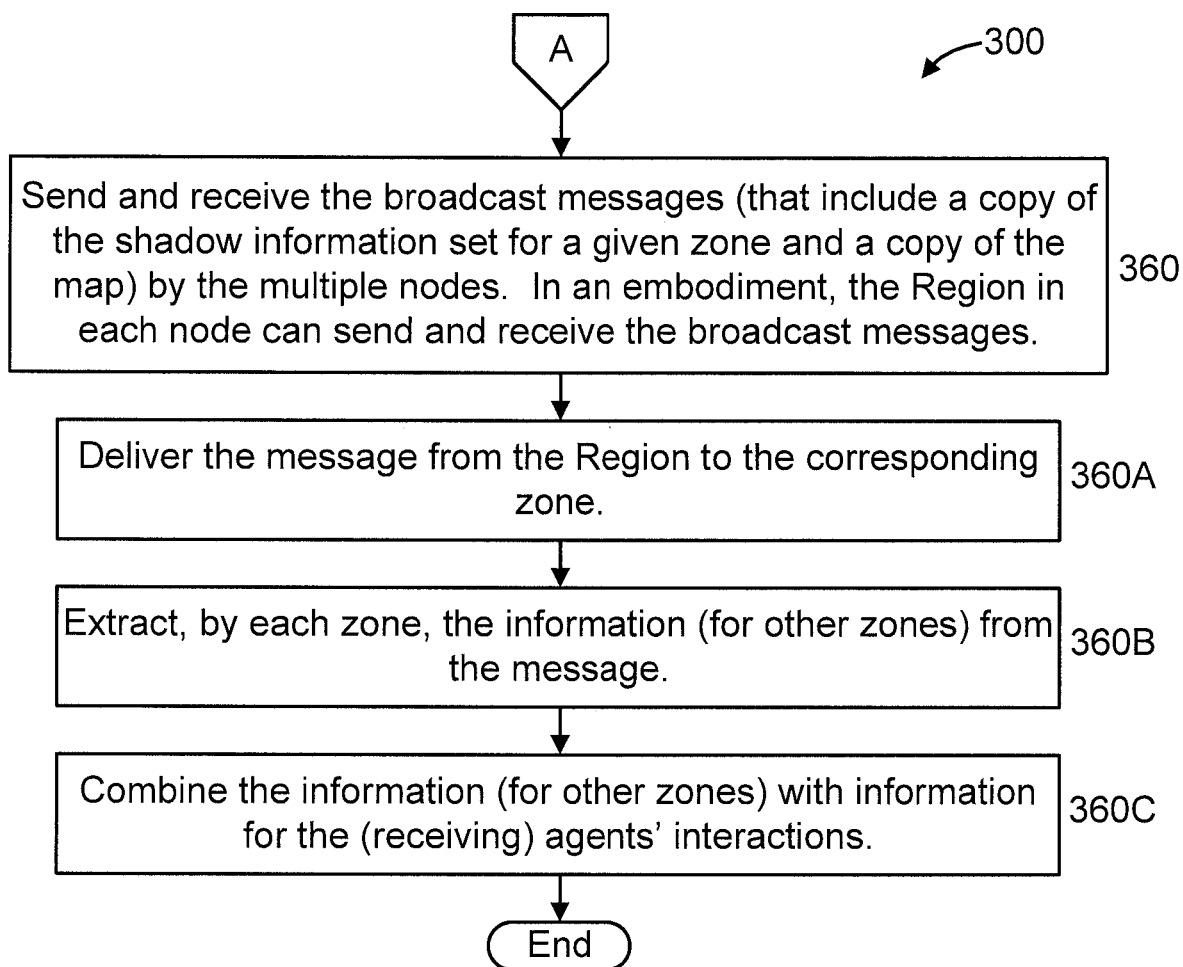
Figure 8:
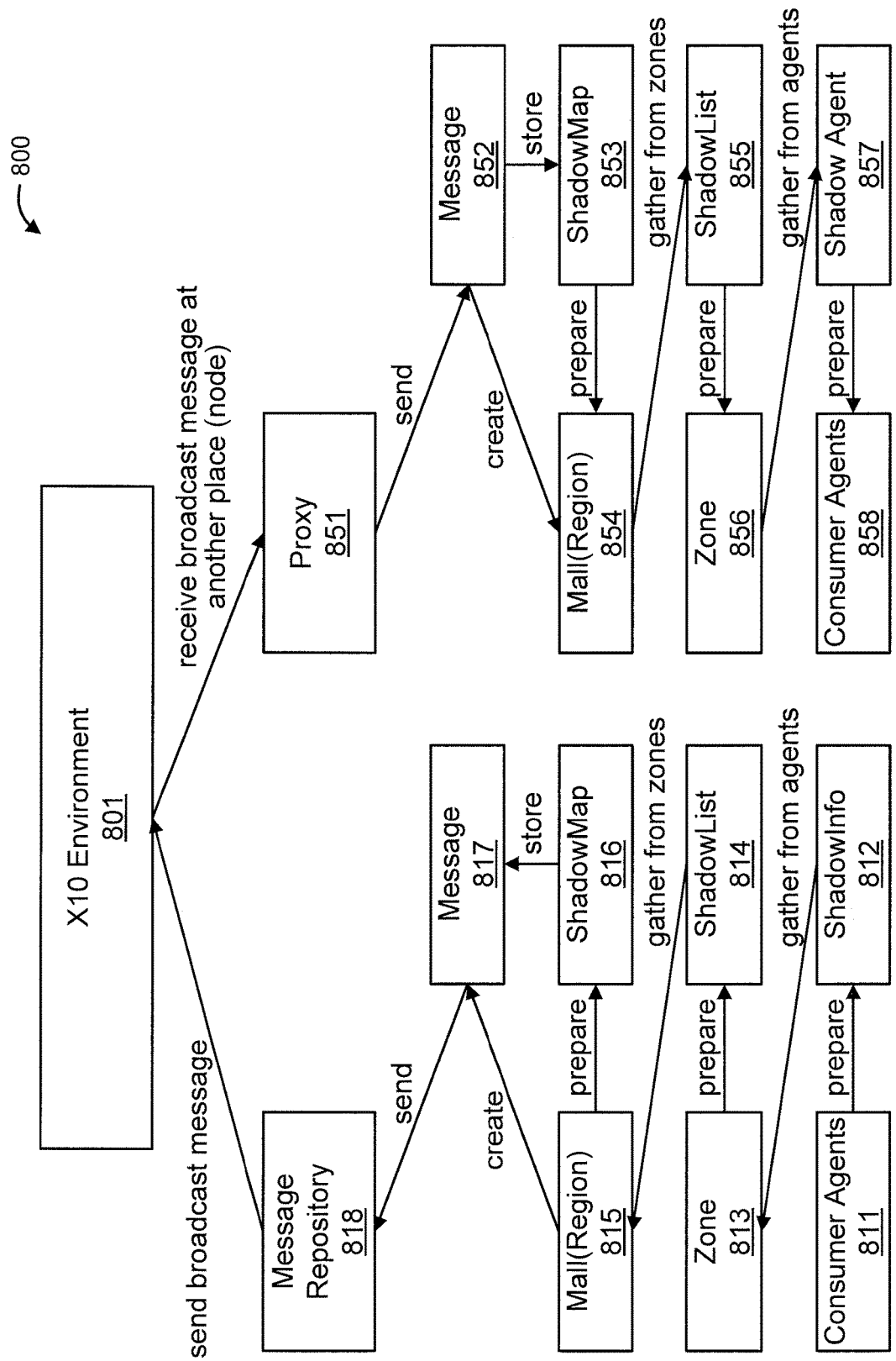
FIG. 8 shows an exemplary broadcast process of shadow information, in accordance with an embodiment of the present invention.

Further, it is to be appreciated that processing system 100 may perform at least part of the methods/processes described herein including, for example, at least part of method 300 of FIGS. 3-4 and/or at least part of process 800 of FIG. 8. Similarly, part or all of system 200 may be used to perform at least part of method 300 of FIGS. 3-4 and/or at least part of process 800 of FIG. 8.

FIG. 2 shows an exemplary environment 200 to which the present invention can be applied, in accordance with an embodiment of the present invention.

In an embodiment, the environment can be an X10 environment. Of course, the present invention is not limited to only X10 environments and, thus, can be applied to other environments as readily appreciated by one of ordinary skill in the art given the teachings of the present invention provided herein, while maintaining the spirit of the present invention.

The environment 200 includes a set of nodes 210. In an embodiment, the set of nodes 210 are part of a distributed data processing system.

The set of nodes 210 include a source node 210A and other nodes 210B. At any given time, the source node 210A from among the set of nodes 210 can change, thus changing which of the nodes is the source node and which are the other nodes at a given time. Accordingly, all of the nodes are generally identified using reference numerals 210, 210A, and 210B.

Each of the nodes 210B includes a set (one or more) of interaction specific shadow agents (also interchangeably referred to herein as "agent-based simulators" and "shadow agents" in short) 211 and an original agent 212. The interaction specific shadow agents 211 are formed by extracting agent interaction data from an original agent at a source node utilizing agent-based simulators. The shadow agents 211 are used for a simulation that captures agent interaction data for interactions between the shadow agents 211 during the simulation. The shadow agents 211 at the other nodes 210B correspond to the original agent 212 at the source node 210A. The shadow agents 211 are projected in the other nodes 210B from the source node 210A. In an embodiment, each of the shadow agents 211 only includes the information required to compute a specific interaction (e.g., position and speed) at each time step of the simulation in order to decrease the size of data transferred among the set of nodes 210. That is, each of the shadow agents 211 include a subset of all of the data that is included in the original node. The subset can correspond to a subset of agent interactions. In an embodiment, each of the shadow agents 211 includes an agent-based simulator component for extracting agent interaction data from the original agent 212. In an embodiment, the agent-based simulator component participates in a simulation performed on the nodes 210 and extracts information relating to the simulation. In this way, less than all of the data of an original agent needs to be sent to other places, as opposed to sending all of the data of the original agent.

The environment 200 can be divided into zones, such that required information for the shadow agents is collected in each of the zones based on the agents' behavior models for the simulation.

In an embodiment, the range of projection can be reduced if there is no agent to interact with in the corresponding zones of the other nodes 210B. Of course, if there is no agent in the current zone, then no message is needed for sending or receiving from or to the current zone.

In the embodiment shown in FIG. 2, the elements thereof are interconnected wirelessly. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIGS. 3-4 shows an exemplary method 300 for shadow agent projection in multiple places in a distributed environment, in accordance with an embodiment of the present invention. In an embodiment, steps 310 and 320 can be considered to correspond to simulation preparation, step 330 can be considered to correspond to a start of the simulation, and steps 340-360 can be considered to correspond to performance of the simulation.

At step 310, divide a distributed area, having multiple nodes, into multiple zones. In an embodiment, step 310 can involve generating a map that delineates the multiple zones.

At step 320, generate one or more agents in each of the multiple nodes. Generation of the agents can occur in accordance with a given schedule or randomly. In an embodiment, the number of agents generated at each node can be easily balanced because the number of agents at each zone does not change during the simulation.

At step 330, for each zone, prepare an information set of each agents' interactions and behavior in the zone (hereinafter interchangeably referred to as "agents' information") together with information for shadow agents (hereinafter interchangeably referred to as "shadow agents' information") (if the shadow agents exist).

At step 340, at each time step of the simulation, compute the agent interaction and behavior with the agents' information and shadow agents' information, and modify in the map any position changes of the agents' positions in the map that can cause movement between zones. Agents' behaviors depend on other agent information stored by the zone. Each zone updates the membership of its agents.

At step 350, after all agents in a given zone complete their actions (for a given simulation time step), aggregate (by the zone, e.g., by a particular node/agent in the zone) the interaction information of interacting agents into a shadow information set and generate a broadcast message to send to other nodes (e.g., X10 Places, through the Region and X10-Based Agent Simulation on Distributed Infrastructure (XASDI) framework that includes the shadow information set). In an embodiment, the broadcast message can also include the map in its current form corresponding to the current simulation time step.

At step 360, send and receive the broadcast messages (that include a copy of the shadow information set for a given zone and a copy of the map) by the multiple nodes. In an embodiment, the Region in each node can send and receive the broadcast messages. As used herein, the term "Region" refers to a particular class type in XASDI framework used to manage hierarchical structure of Places and agents and execution of the simulation at each node. The agent in XASDI is referred to as a "Citizen" and a Citizen has corresponding "CitizenProxy" that is managed in the simulation environment to exchange messages. To manage CitizenProxy, XASDI provides a hierarchical container structure called Place, Region and World at each node. CitizenProxies belong to a Place, and Places belong to a Region. A World can include several Regions, but usually there is only one Region in a World. Here, we consider Region and World as the same entity for the sakes of illustration and simplicity. Of course, consideration of Region and World as different entities can also be considered in accordance with the teachings of the present invention, while maintaining the spirit of the present invention.

In an embodiment, step 360 includes steps 360A, 360B, and 360C.

At step 360A, deliver the message from the Region to the corresponding zone.

At step 360B, extract, by each zone, the information (for other zones) from the message.

At step 360C, combine the information (for other zones) with information for the (receiving) agents' interactions.

Thus, regarding steps 360A, 360B, and 360C, when the Region receives the shadow information map, the Region delivers the shadow information set to the corresponding zone. Then, each zone extracts the information of shadow agents from the corresponding zone in other nodes and puts the shadow information together with the information set of agents' interactions that will be used to evaluate agent behavior in the next time step.

Figure 5:
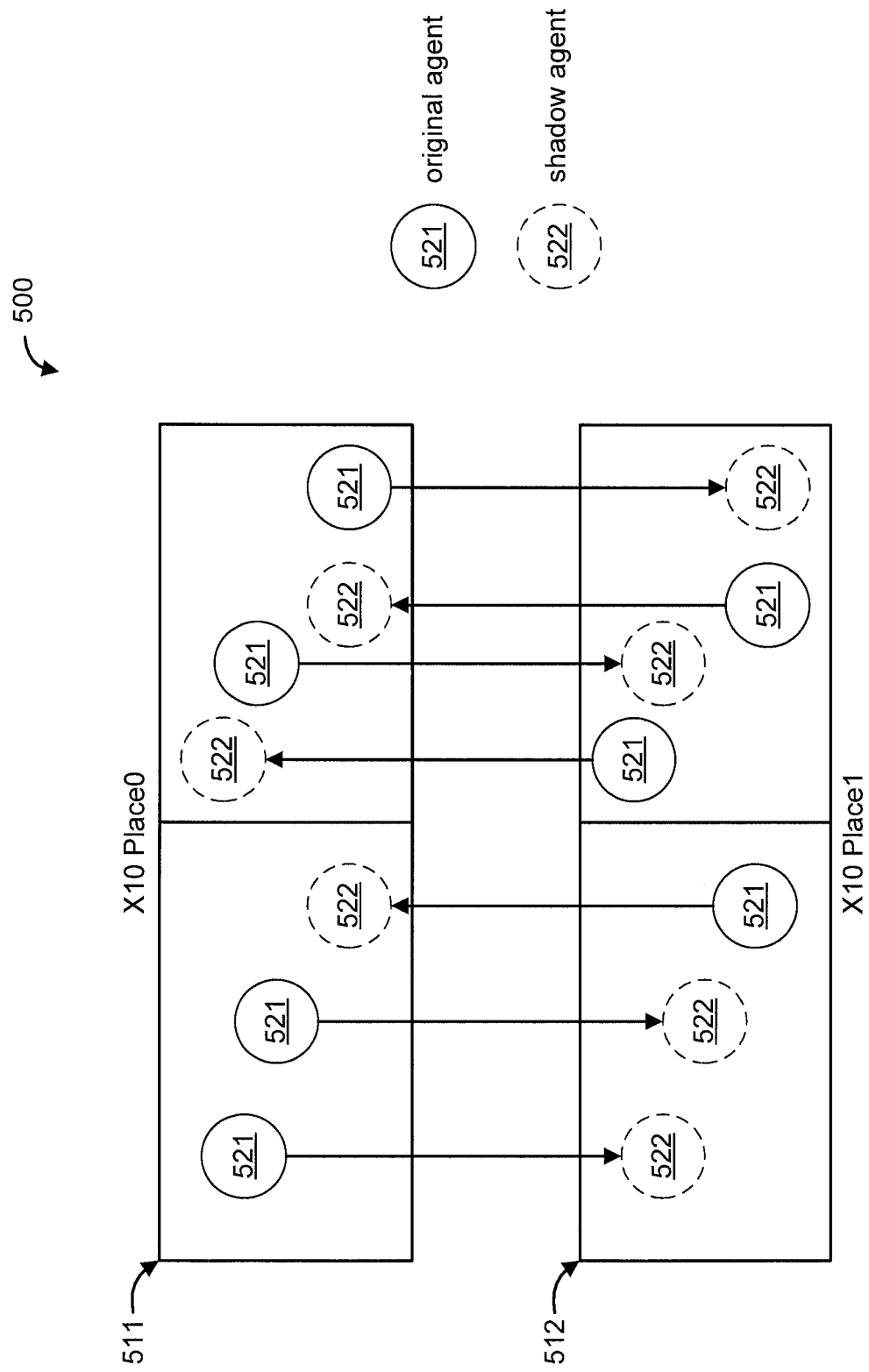
FIG. 5 shows an exemplary projection of multiple shadow agents, in accordance with an embodiment of the present invention.

FIG. 5 shows an exemplary projection 500 of multiple shadow agents, in accordance with an embodiment of the present invention.

The projection 500 involves a first place (e.g., an X10 Place0) 511 and a second place (an X10 Place1) 512. Original agents 521 at each place project a corresponding shadow agent 522 at the other place. In this way, transactions of only required data for agent interactions at each simulation time step can be achieved using lightweight broadcast messages versus transferring a whole agent (i.e., an agent and all of its data) when a location change happens between places.

Figure 6:
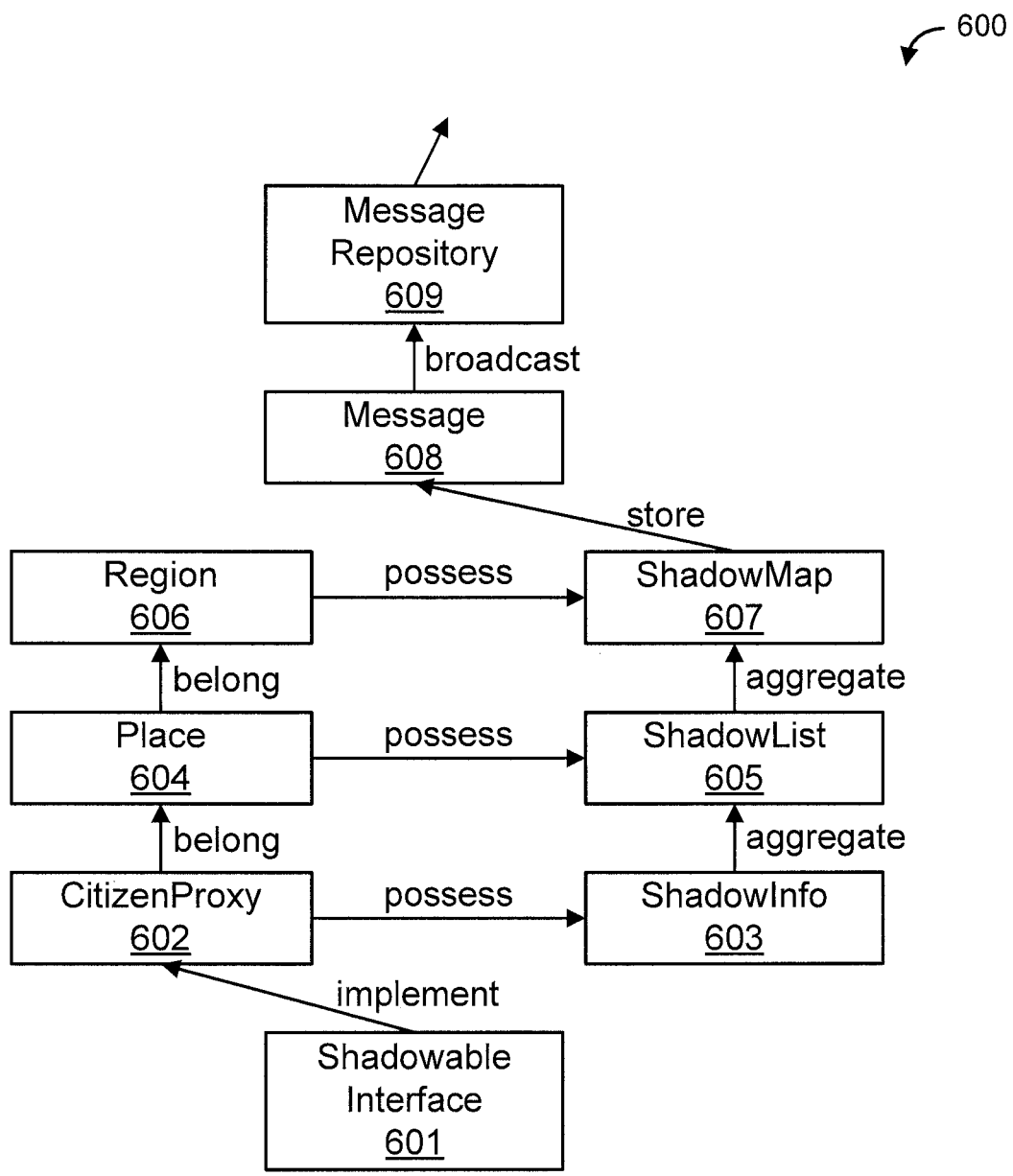
FIG. 6 shows an exemplary class framework, in accordance with an embodiment of the present invention.

FIG. 6 shows an exemplary class framework 600, in accordance with an embodiment of the present invention.

The class framework 600 involves the following classes: Shadowable interface 601; CitizenProxy 602; ShadowInfo 603; Place 604; ShadowList 605; Region 606; ShadowMap 607; Message 608, and Message Repository 609.

The following operations are performed for the aforementioned classes: Shadowable interface 601 to Citizen Proxy 602 (implement); CitizenProxy 602 to ShadowInfo 603 (possess); CitizenProxy 602 to Place 604 (belong); ShadowInfo 603 to ShadowList 605 (aggregate); Place 604 to ShadowList 605 (possess); Place 604 to Region 606 (belong); ShadowList 605 to ShadowMap 607 (aggregate); Region 606 to ShadowMap 607 (possess); ShadowMap 607 to Message 608 (store); Message 608 to Message Repository 609 (broadcast).

Figure 7:
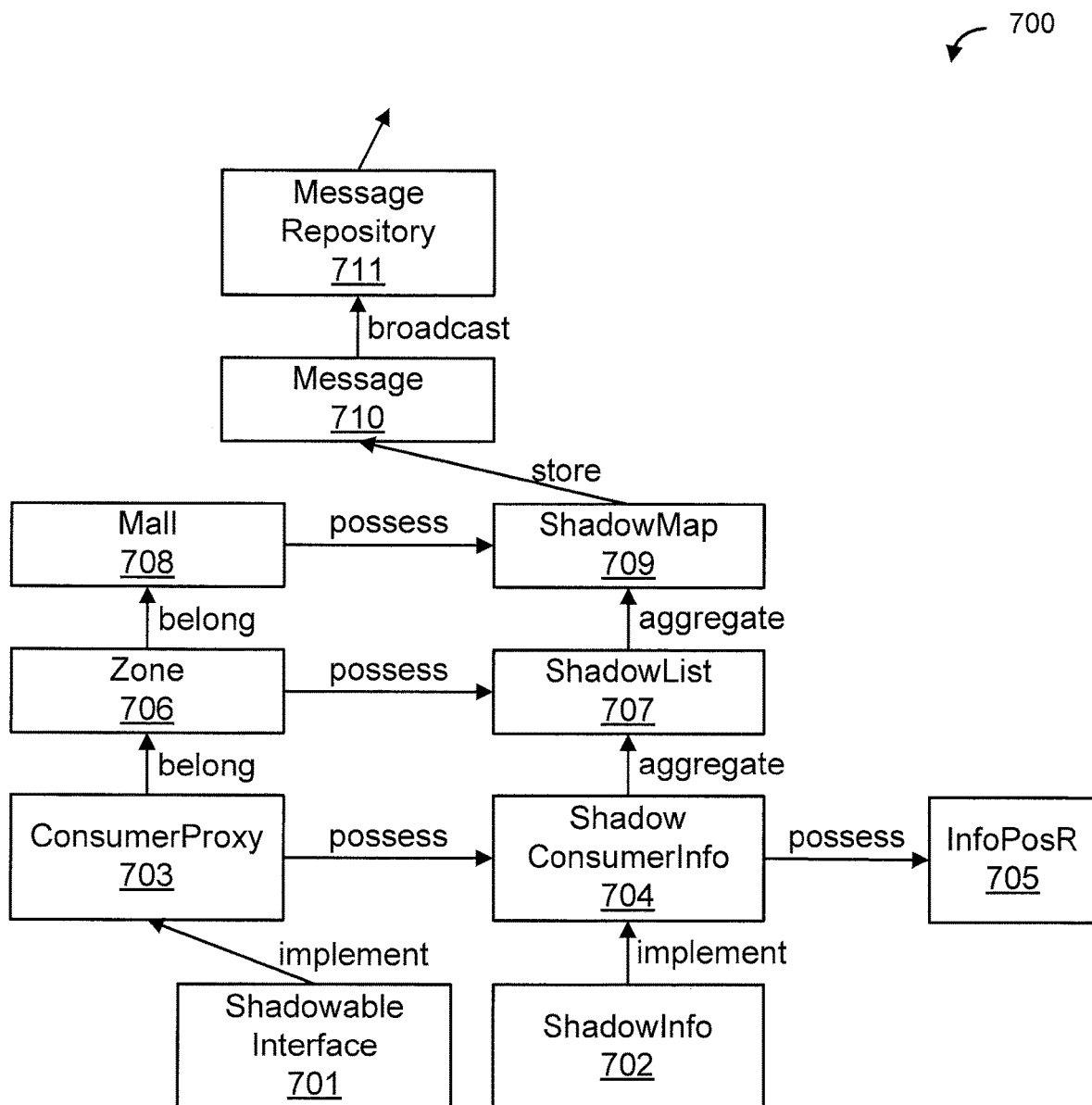
FIG. 7 shows an exemplary class framework of a mall application, in accordance with an embodiment of the present invention.

FIG. 7 shows an exemplary class framework 700 of a mall application, in accordance with an embodiment of the present invention.

The class framework 700 involves the following classes: Shadowable Interface 701, ShadowInfo 702, ConsumerProxy 703; Shadow ConsumerInfo 704; InfoPosR 705; Zone 706; ShadowList 707; Mall 708; ShadowMap 7609; Message 710; and MessageRepository 711.

The following operations are performed for the aforementioned classes: Shadowable interface 701 to ConsumerProxy 703 (implement); ShadowInfo 702 to Shadow ConsumerInfo 704 (implement); ConsumerProxy 703 to Shadow ConsumerInfo 704 (possess); Shadow ConsumerInfo 704 to InfoPosR 705 (possess); ConsumerProxy 703 to Zone 706 (belong); Shadow ConsumerInfo 704 to ShadowList 707 (aggregate); Zone 706 to ShadowList 707 (possess); Zone 706 to Mall 708 (belong); ShadowList 707 to ShadowMap 709 (aggregate); Mall 708 to ShadowMap 709 (possess); ShadowMap 709 to Message 710 (store); and Message 710 to MessageRepository 711 (broadcast).

FIG. 8 shows an exemplary broadcast process 800 of shadow information, in accordance with an embodiment of the present invention.

The broadcast process 800 involves an X10 environment 801.

In the example of FIG. 8, the broadcast process 800 involves a sending node 810 and a receiving node 850. While only one sending and receiving node are shown for the sakes of illustration and clarity, it is to be appreciated that more than one node can send messages and more than one node can receive messages in accordance with the teachings of the present invention.

The sending node 810 involves the following: Consumer Agents 811; ShadowInfo 812; Zone 813; ShadowList 814; Mall (Region) 815; ShadowMap 816; Message 817; and Message Repository 818.

The following operations are performed regarding the sending node 810: Consumer Agents 811 to ShadowInfo 812 (prepare); ShadowInfo 812 to Zone 813 (gather from agents); Zone 813 to ShadowList 814 (prepare); ShadowList 814 to Mall (Region) 815 (gather from zones); Mall (Region) 815 to ShadowMap 816 (prepare); Mall (Region) 815 to Message 817 (create); ShadowMap 816 to Message 817 (store); Message 817 to Message Repository 818 (send); and Message Repository 818 to X10 environment 801 (send broadcast message).

The receiving node 850 involves the following: Proxy 851; Message 852; ShadowMap 853; Mall (Region) 854; ShadowList 855; Zone 856; ShadowAgent 857; and Consumer Agents 858.

The following operations are performed regarding the receiving node 850: X10 environment 850 to Proxy 851 (receive broadcast message at another place/node); Proxy 851 to Message 852 (receive); Message 852 to ShadowMap 853 (extract); Message 852 to Mall (Region) 854 (receive); ShadowMap 853 to Mall (Region) 854 (obtain); Mall (Region) 854 to ShadowList 855 (deliver to zones); ShadowList 855 to Zone 856 (receive); Zone 856 to Shadow Agent 857 (maintain for agents); and Shadow Agent 857 to Consumer Agents 858 (use data for interaction).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
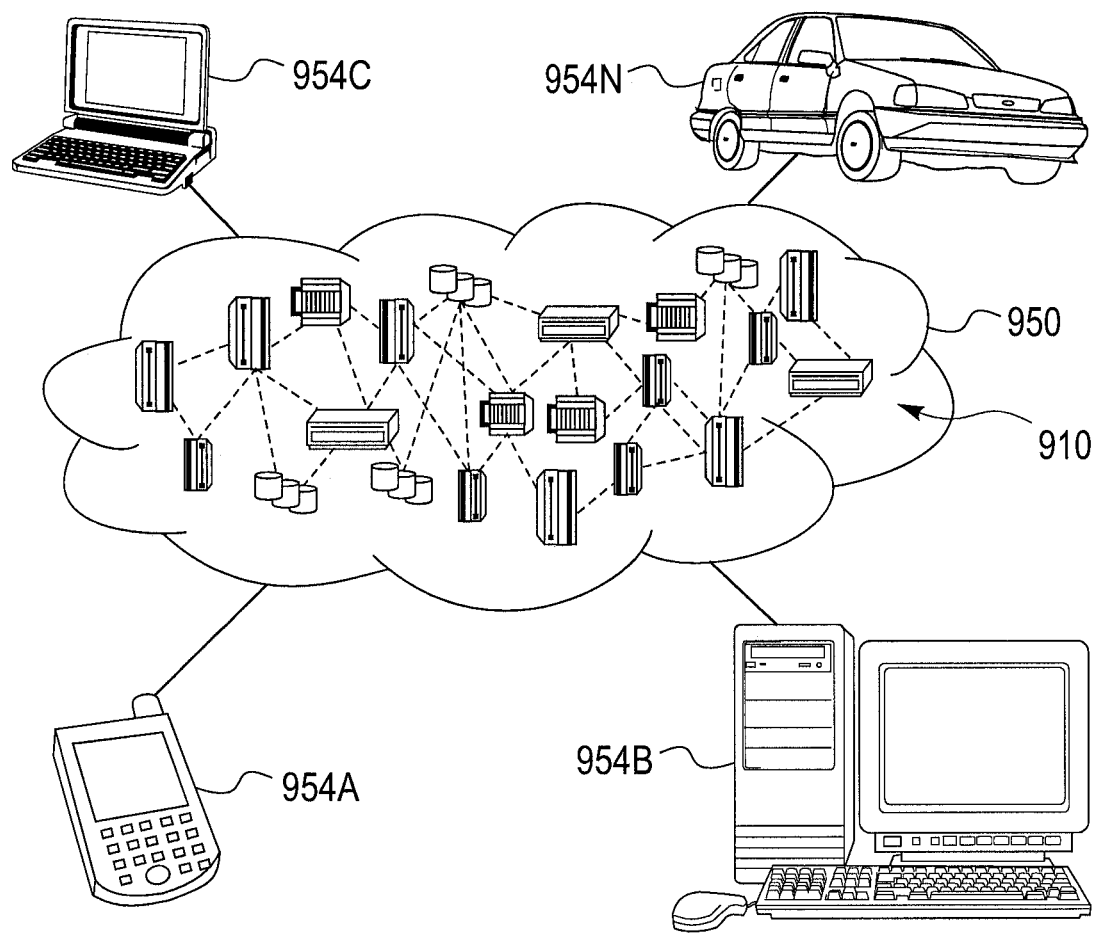
FIG. 9 shows a cloud computing environment, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
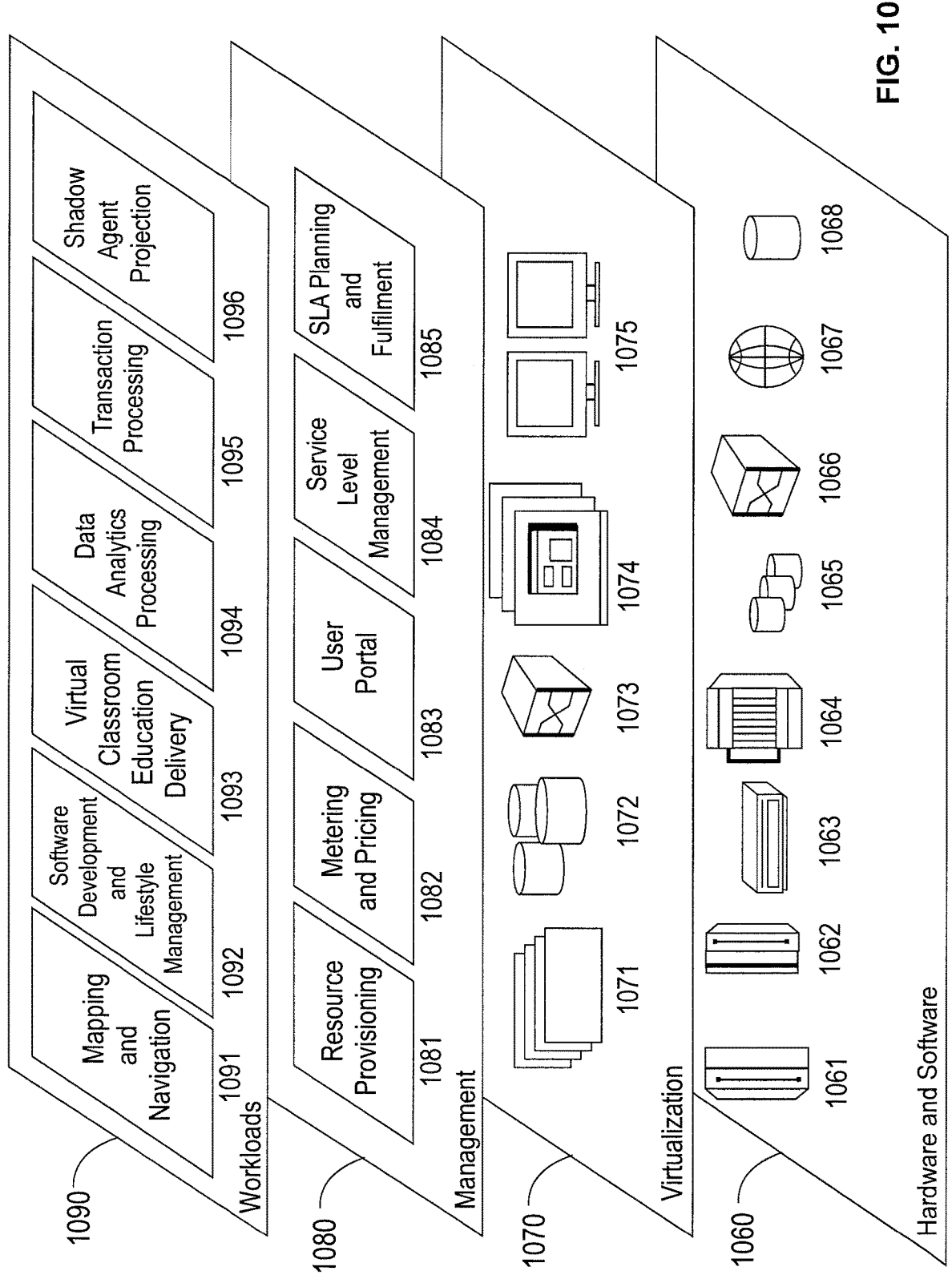
FIG. 10 shows abstraction model layers, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and shadow agent projection 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for distributed computing, comprising:
   forming interaction specific shadow agents having agent-based simulator components by extracting agent interaction data from an original agent at a source node; and
   broadcasting aggregated agent interaction data collected from the original agent at the source node to other nodes in a distributed area, and using the aggregated agent interaction data to calculate agent interactions and behaviors therefrom,
   wherein the agent interaction data extracted from the original agent consists of a constrained subset of data derived from a set of data of the original agent at the source node.

2. The computer-implemented method of claim 1, wherein each of the interaction specific shadow agents is constrained to only include the agent interaction data required for computing a specific agent interaction at each of a plurality of simulation time steps so as to decrease an amount of data transferred amongst the nodes.

3. The computer-implemented method of claim 1, wherein the constrained subset of data, derived from the set of data of the original agent at the source node, is constrained to only include data for data classes selected from the group consisting of position and speed.

4. The computer-implemented method of claim 1, further comprising projecting the interaction specific shadow agents, corresponding to the original agent at the source node, in the other nodes to calculate and extract the agent interactions and behaviors, wherein the subset of data, derived from the set of data of the original agent at the source node, is less than a total amount of data in the set of data of the original agent at the source node and is limited to position and speed.

5. The computer-implemented method of claim 1, wherein the aggregated interaction data is broadcasted from the source node to the other nodes in a message.

6. The computer-implemented method of claim 1, further comprising:
   generating a map of the distributed area; and
   dividing the distributed area into a plurality of zones.

7. The computer-implemented method of claim 6, further comprising aggregating the agent interaction data on a zone basis.

8. The computer-implemented method of claim 7, wherein said broadcasting step broadcasts the aggregated agent interaction data on the zone basis.

9. The computer-implemented method of claim 1, wherein said broadcasting step is constrained to only broadcast to particular ones of the other nodes that have been selected using the map.

10. The computer-implemented method of claim 1, wherein said utilizing and broadcasting steps are performed for a particular simulation time step after all of the interaction specific shadow agents have completed operations relating to the particular simulation time step and the agent interaction data relating to the particular time step has been updated at the other nodes, and wherein said utilizing and broadcasting steps are repeated for a subsequent simulation time step.

11. The computer-implemented method of claim 1, wherein said broadcasting step is constrained to only broadcast to particular ones of the other nodes that have been determined as participants in a particular agent interaction.

12. The computer-implemented method of claim 1, wherein the source node and the other nodes form a set of nodes, and wherein the source node is switched to a different one of the other nodes during a current simulation step.

* * * * *